(12) United States Patent
Kurosawa et al.

(10) Patent No.: US 6,807,521 B1
(45) Date of Patent: Oct. 19, 2004

(54) COMPUTER READABLE PROGRAM PRODUCT, GAME CONTROL METHOD, AND VIDEO GAME SYSTEM

(75) Inventors: Yasushi Kurosawa, Kanagawa (JP); Manabu Washio, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 0 days.

(21) Appl. No.: 09/559,128

(22) Filed: Apr. 28, 2000

(51) Int. Cl.[7] .......................... G06F 9/45; G06F 17/00; G06F 19/00; A63F 13/00; A63F 9/24
(52) U.S. Cl. .............................. 703/22; 463/7
(58) Field of Search .................. 463/23, 29, 9; 703/6

(56) References Cited

U.S. PATENT DOCUMENTS 6,488,586 B1 * 12/2002 Kobayashi et al. ........... 463/43

OTHER PUBLICATIONS

Steve Winter, Jon Pickens, "Advanced Dungeons&Dragons Player's Handbook", 2nd Edition, 1989, TSR, pp. 4–6, 88–91, 93–106.*
Gary Gygax, "Advanced Dungeons&Dragons, Dungeon Masters Guide", 1979, TSR, pp. 3–6, 165–169.*
Ultma Reference Card, Electronic Arts–Origin Systems, 1998, pp. 2–48.*
Cameron Crotty, "Diablo", MacWorld Magazine, Dec. 1998, pp. 76.*
Cameron Crotty, "Diablo", MacWorld Magazine, Aug. 1998, p. 64.*
Blizzard Entertainment "Diablo", XP–002251757, <www.blizzard.com/diablo>, 1997.
Blizzard Entertainment "Diablo", XP–002251757, <www.blizzard.com/diablo>, 1997.

* cited by examiner

Primary Examiner—Kevin J. Teska
Assistant Examiner—Dwin M. Craig
(74) Attorney, Agent, or Firm—Greenblum & Bernstein, P.L.C.

(57) ABSTRACT

A computer readable program product stores a role playing game which sets items of equipment provided to a player character in accordance with an operational input, links special abilities with the items of equipment, increases a level of mastery of an item of equipment of a player character in accordance with fight experience between the player character and an enemy character, sets an AP value for a special ability linked with an item of equipment in accordance with the level of mastery of the item of equipment, and allows the player character to use a special ability after the AP value of that special ability reaches a value for acquisition of that special ability.

25 Claims, 10 Drawing Sheets

| TYPE | ABILITY | ACQUISITION POINTS |
|---|---|---|
| MAGIC | ELEMENTARY FIRE MAGIC | 25 |
| | INTERMEDIATE FIRE MAGIC | 50 |
| | ADVANCED FIRE MAGIC | 125 |
| | ELEMENTARY BLIZZARD MAGIC | 26 |
| | INTERMEDIATE BLIZZARD MAGIC | 50 |
| | ADVANCED BLIZZARD MAGIC | 125 |
| | ELEMENTARY LIGHTNING MAGIC | 25 |
| | INTERMEDIATE LIGHTNING MAGIC | 50 |
| | ADVANCED LIGHTNING MAGIC | 125 |
| ABILITY VALUE CHANGE | LIGHTNING INCREASE IN ATTACK POWER | 30 |
| | ⋮ | ⋮ |

| NAME OF EQUIPMENT (401) | ABILITY (402) |
|---|---|
| STAFF | ELEMENTARY FIRE MAGIC |
| | ELEMENTARY BLIZZARD MAGIC |
| | ELEMENTARY LIGHTNING MAGIC |
| MAGICIAN'S STAFF | INTERMEDIATE FIRE MAGIC |
| | INTERMEDIATE BLIZZARD MAGIC |
| | INTERMEDIATE LIGHTNING MAGIC |
| DIAMOND STAFF | ADVANCED FIRE MAGIC |
| | ADVANCED BLIZZARD MAGIC |
| | ADVANCED LIGHTNING MAGIC |
| LEATHER CLOTHING | ELEMENTARY LIGHTNING MAGIC |
| | INTERMEDIATE LIGHTNING MAGIC |
| | LIGHTNING INCREASE IN ATTACK POWER |
| ⋮ | ⋮ |

Fig. 4

| TYPE | ABILITY | ACQUISITION POINTS |
|---|---|---|
| MAGIC | ELEMENTARY FIRE MAGIC | 25 |
| | INTERMEDIATE FIRE MAGIC | 50 |
| | ADVANCED FIRE MAGIC | 125 |
| | ELEMENTARY BLIZZARD MAGIC | 26 |
| | INTERMEDIATE BLIZZARD MAGIC | 50 |
| | ADVANCED BLIZZARD MAGIC | 125 |
| | ELEMENTARY LIGHTNING MAGIC | 25 |
| | INTERMEDIATE LIGHTNING MAGIC | 50 |
| | ADVANCED LIGHTNING MAGIC | 125 |
| ABILITY VALUE CHANGE | LIGHTNING INCREASE IN ATTACK POWER | 30 |
| ⋮ | ⋮ | ⋮ |

Fig.5

| ABILITY | ACCUMULATED POINTS |
|---|---|
| ELEMENTARY FIRE MAGIC | 25 |
| INTERMEDIATE FIRE MAGIC | 31 |
| ADVANCED FIRE MAGIC | 31 |
| ELEMENTARY BLIZZARD MAGIC | 20 |
| INTERMEDIATE BLIZZARD MAGIC | 20 |
| ADVANCED BLIZZARD MAGIC | 20 |
| ELEMENTARY LIGHTNING MAGIC | 67 |
| INTERMEDIATE LIGHTNING MAGIC | 67 |
| ADVANCED LIGHTNING MAGIC | 42 |
| LIGHTNING INCREASE IN ATTACK POWER | 50 |
| ⋮ | ⋮ |

COMPUTER READABLE PROGRAM PRODUCT, GAME CONTROL METHOD, AND VIDEO GAME SYSTEM

BACKGROUND OF THE INVENTION

1. Field of the Invention

The present invention relates to a computer readable program product storing a program of a video game, a game control method, and video game system for the same. More particularly, the present invention relates to a computer readable program product storing a program of a video game of the role playing game (RPG) type, a game control method and video game system for the same.

2. Background of the Invention

There are several types of video games played by video game systems. One type of video game is called a role playing game, where the abilities of a character operated by a player increase along with the progress of the game.

In a video game of the type called a role playing game, various actions are executed for the player character, enemy character becoming the opponent in a fight, etc. in accordance with operations by the player or action control algorithms of characters contained in the game program. The actions include attacks on an enemy character, defense from attacks of an enemy character, acquisition of items of equipment for the player character, etc. Here, the execution of actions is defined as execution by a video game system of image display, sound and voice output, fight processing, etc. in accordance with actions to be performed by the player character, enemy character, or other character in the virtual space during the game.

In a role playing game, the following are performed along with progress in the game:

(1) Experience values are set for each character. The experience values are increased by experiences and actions in the game, such as fights. The rise in level along with the increase in experience values increases the attack skills, magic, and other abilities able to be used step by step.

(2) The attack skills, magic, and other available abilities gradually increase along with the growth of the character.

(3) There are weapons, defensive gear, accessories, and other available items of equipment. Abilities able to be used are set in advance for each item. The attack skills, magic, and other special abilities linked with these items of equipment can be used only when a character is equipped with these items of equipment.

(4) Attack skills and other skills are acquired by continuously defeating enemy characters and other results of fights or actions are set in swords, shields, and other available items of equipment. The skills set in the items of equipment can be used only when a character is equipped with or owns the items of equipment in which the skills are set In general role playing games, the attack skill, magic, and other abilities available to a character increase along with the progress in the game based on rules like the above and therefore it was possible to give diversity to the available attack skill, magic, and other abilities along with the progress in the game.

With a game with the same rules, however, the player (user) loses interest in the game. Further, role playing games like the above tended to increase abilities monotonously and therefore lacked interest as games.

Accordingly, a highly interesting role playing game fresher than general ones, of an interesting nature, increasing the attack skill, magic, or other special abilities available to a character, and not becoming boring during the game is sought.

SUMMARY OF THE INVENTION

An object of the present invention is to provide a computer readable program product storing a program of a video game giving diversity to the manner of increase of the attack skill, magic, and other special abilities available to a character and thereby enhanced in interest as a game and a game control method and video game system for the same.

To achieve the above object, according to a first aspect of the present invention, there is provided a computer readable program product storing a game program making a character use an item of equipment in the progress of the game, which stores a program providing one or more items of equipment linked with abilities to be given to a character by mastery in accordance with operation of the player, making a character controlled in accordance with operations of a player use an item of equipment, judging the level of mastery of the item of equipment used, and, when judging that the level of mastery satisfies a predetermined condition, giving the character the ability linked with the item of equipment to enable use in accordance with subsequent operations of the player.

According to a second aspect of the present invention, there is provided a method of processing a game program making a character use an item of equipment in the progress of the game, which provides one or more items of equipment linked with abilities to be given to a character by mastery in accordance with operation of the player, makes a character controlled in accordance with operations of a player use an item of equipment, judges the level of mastery of the item of equipment used, and, when judging that the level of mastery satisfies a predetermined condition, gives the character the ability linked with the item of equipment to enable use in accordance with subsequent operations of the player.

According to a third aspect of the present invention, there is provided a game system making a character use an item of equipment in the progress of the game, which is provided with a unit for execution of the game in accordance with a program, a memory for, storing all or part of the program, and a display screen for displaying the game being executed by the unit, the unit, in accordance with a program stored in the memory, providing one or more items of equipment linked with abilities to be given to a character by mastery in accordance with operation of the player by mastery in accordance with operation of the player, making a character controlled in accordance with operations of a player use an item of equipment, judging the level of mastery of the item of equipment used, and, when judging that the level of mastery satisfies a predetermined condition, giving the character the ability linked with the item of equipment to enable use in accordance with subsequent operations of the player.

BRIEF DESCRIPTION OF THE DRAWINGS

These and other objects and features of the present invention will become clearer from the following description of the preferred embodiments given with reference to the attached drawings, in which.

DESCRIPTION OF THE PREFERRED EMBODIMENTS

Preferred embodiments of the present invention will be explained below with reference to the drawings.

Figure 1:
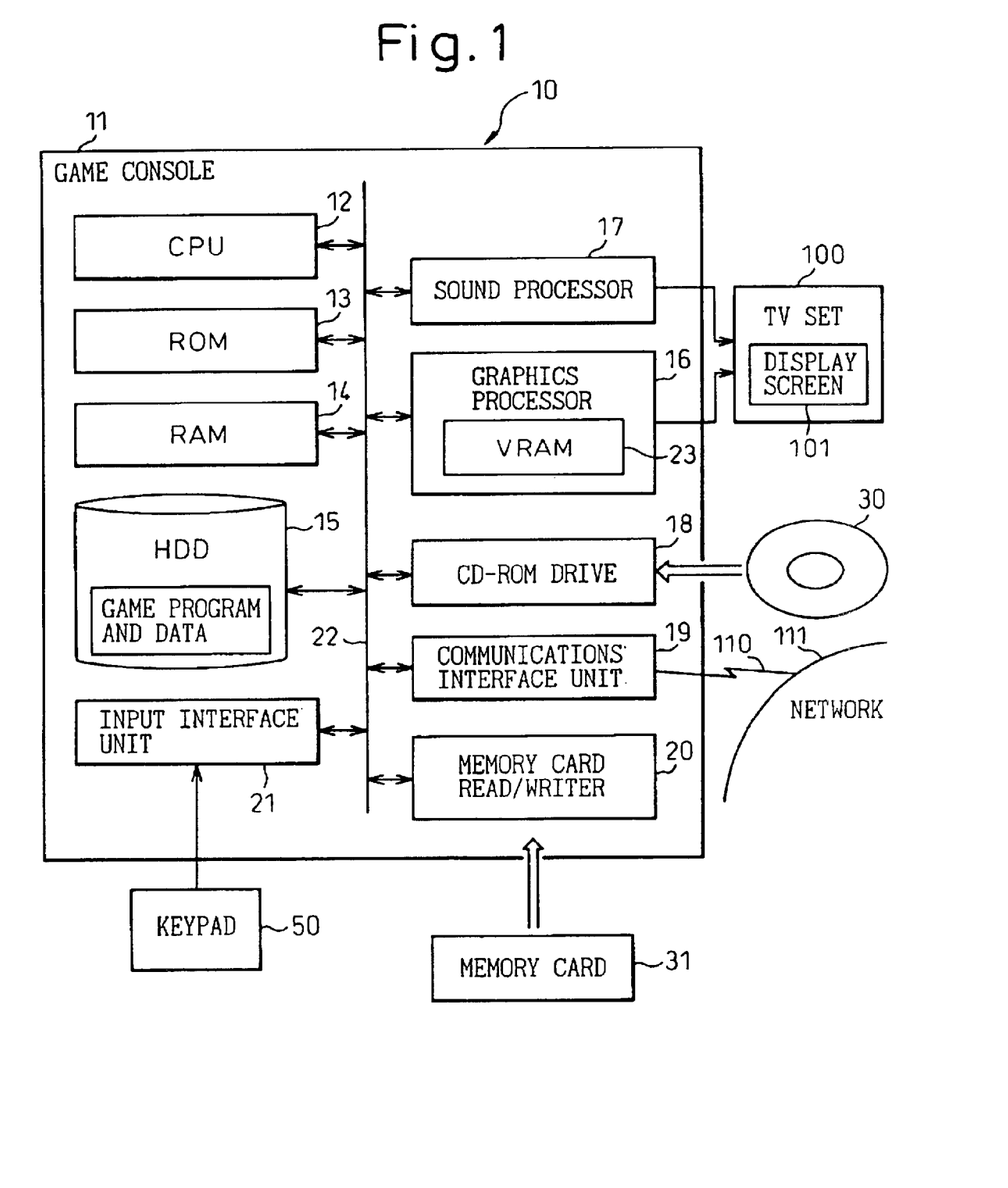
FIG. 1 is a block diagram of an example of the overall configuration of a video game system according to an embodiment of the present invention.

FIG. 1 shows an example of a video game system according to an embodiment of the present invention. The video game system 10 executes a program stored in a computer readable program product according to the present invention. The video game system 10 shown in FIG. 1 is used for working a game control method according to the present invention.

The video game system 10 includes, for example, a game console 11 and a keypad 50 connected to an input side of the game console 11. A television set 100 having a cathode ray tube (CRT) etc. is connected to an output side of the game console 11 as a monitor with speakers. The keypad 50 is operated by a user (player) for giving user operating instructions to the game console 11. The television set 100 displays a video (image) and outputs sounds in accordance with the content of the game based on a video signal (image signal) or sound signal from the game console 11.

The game console 11 includes, for example, a central processor (CPU) 12, read only memory (ROM) 13, random access memory (RAM) 14, hard disk drive (HDD) 15, graphics processor 16, sound processor 17, compact disk ROM (CD-ROM) drive 18, communications interface unit 19, memory card read/writer 20, input interface unit 21, and bus 22 for connecting these.

The CPU 12 executes the operating system stored in the ROM 13 to control the game system as a whole. Further, the CPU 12 executes a game program stored in the later explained program storage area of the RAM 14.

Figure 2:
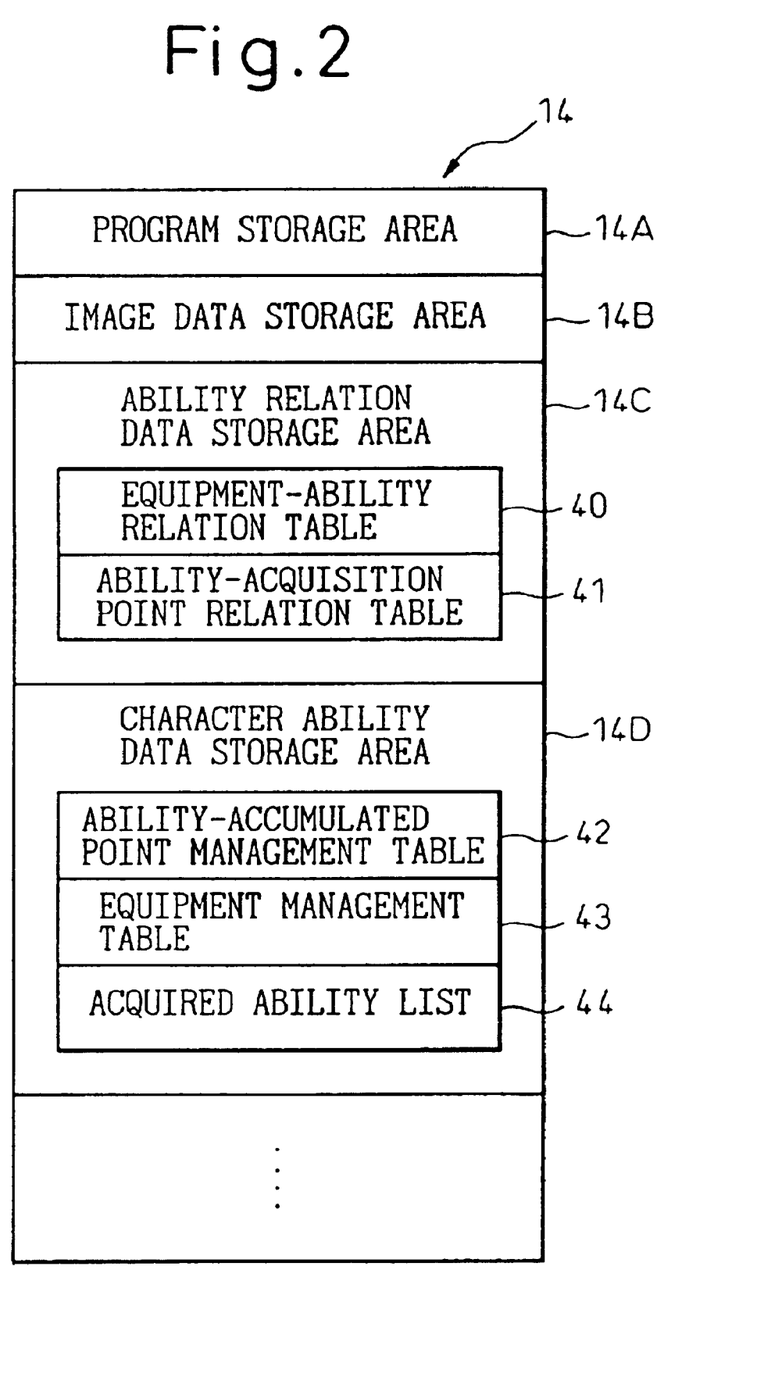
FIG. 2 is a view explaining an example of the memory configuration of a RAM of a video game system for a game by a game control method according to an embodiment of the present invention.

The RAM 14, as shown in FIG. 2, has defined in it a program storage area 14A for storing the game program, an image data storage area 14B for storing the background, characters, and other image data required in the process of execution of the game program, an ability relation data storage area 14C, and a character ability data storage area 14D.

The RAM 14 stores the game program and image data read by the CD-ROM drive 18 from the CD-ROM 30 in its different areas. Further, the game program or image data may be stored in the hard disk drive 15.

The graphics processor 16 includes a video RAM (VRAM) 23 and uses the VRAM 23 as a frame buffer. Further, the graphics processor 16 generates a video signal based on the image data stored in the frame buffer based on commands from the CPU 12 along with execution of the program and outputs the video signal to the television set 100. Due to this, an image is displayed based on the image data stored in the frame buffer on the display screen 101 of the television set 100.

The sound processor 17 has the function of generating background music, sound effects, and other sound signals. The sound processor 17 generates a sound signal based on data stored in the RAM 14 in accordance with a command from the CPU 12 along with execution of the program and outputs it to the television set 100.

The CD-ROM drive 18 is loaded with a program product, that is, a CD-ROM 30. The CD-ROM drive 18 reads the game program, image data, sound data, etc. stored in the CD-ROM 30.

The communications interface unit 19 is connected selectively to a network 11 by a communications line 110 for data communication with other devices.

The memory card read/writer 20 has inserted in it a memory card 31 which stores data on the interim progress of the game, data on the game environment settings, and other saved data.

The computer readable program product according to the present invention is a computer readable program product storing a game program. The computer readable program product is comprised of a CD-ROM 30 or hard disk drive 15. The program product stores a program for executing the following processing in a computer. That is, it makes the computer execute the program stored in the program product so as to make the computer perform the following processing.

First, processing is executed relating to the action of a player character instructed in accordance with an operating input by the keypad 50 or processing is executed relating to an enemy character instructed in accordance with a preset action control algorithm. Further, a fight between the player character and enemy character is played out on the display screen.

Specifically, for example, weapons, protective gear, accessories, and other items of equipment which the player character is provided with are set in accordance with operational input. An item of equipment is an element in the game having the effect of increasing (or possibly decreasing) the ability of the player character. For example, a weapon item has the effect of increasing the attack ability of a player character. Further, a protective gear item has the effect of increasing (or possibly decreasing) the defensive ability of the player character.

The item with which the player character is equipped can be set in a freely changeable manner by the player by operational input by the player within the range of items of equipment owned by the player character. The items of equipment include weapons, protective gear, accessories, etc. The items of equipment include ones owned from the start of the game and ones picked up, purchased, or seized from an enemy character in the process of progress of the game. It is noted that certain items may be "cursed" which may limit the ability to freely change such items.

Further, items of equipment are linked with usable special abilities (attack skills, magic, defensive skills). The player character is able to use the special abilities linked with the items of equipment when provided with that equipment.

Further, a player character is set with points relating to a special ability (hereinafter referred to as "ability points" or an "AP value") for each special ability. The AP value held by a player character relating to a special ability linked with an item of equipment is updated in accordance with the fight experience between the player character and enemy character. When an AP value reaches a predetermined value, the player character can use the special ability corresponding to that AP value whether or not provided with that equipment. In this embodiment, this processing is executed by the video game system 10.

Next, the memory configuration of the RAM 14 when the video game system 10 is executing a program will be explained. FIG. 2 schematically shows an example of the memory configuration of the RAM 14.

As shown in FIG. 2, the RAM 14 is divided into a program storage area 14A, an image data storage area 14B, an ability relation data storage area 14C, a character ability data storage area 14D, and other storage areas. The program storage area 14A is an area for storing a program loaded from a CD-ROM 30 or other source. The image data storage area 14B is an area for storing the images of the characters in the game, images of the items of equipment of the characters, etc.

The ability relation data storage area 14C stores information serving as the criteria for determining whether each character can use a special ability. In the present embodiment, the ability relation data storage area 14C stores, for example an equipment-ability relation table 40 and ability-acquisition point relation table 41.

Further, the character ability data storage area 14D of the RAM 14 stores information relating to the abilities of a character for each character. In the present embodiment, the character ability data storage area 14D for example stores an ability-accumulated point management table 42, equipment management table 43, and acquired ability list 44.

Next, the contents of the various tables stored in the ability relation data storage area 14C and character ability data storage area 14D will be explained.

Figure 3:
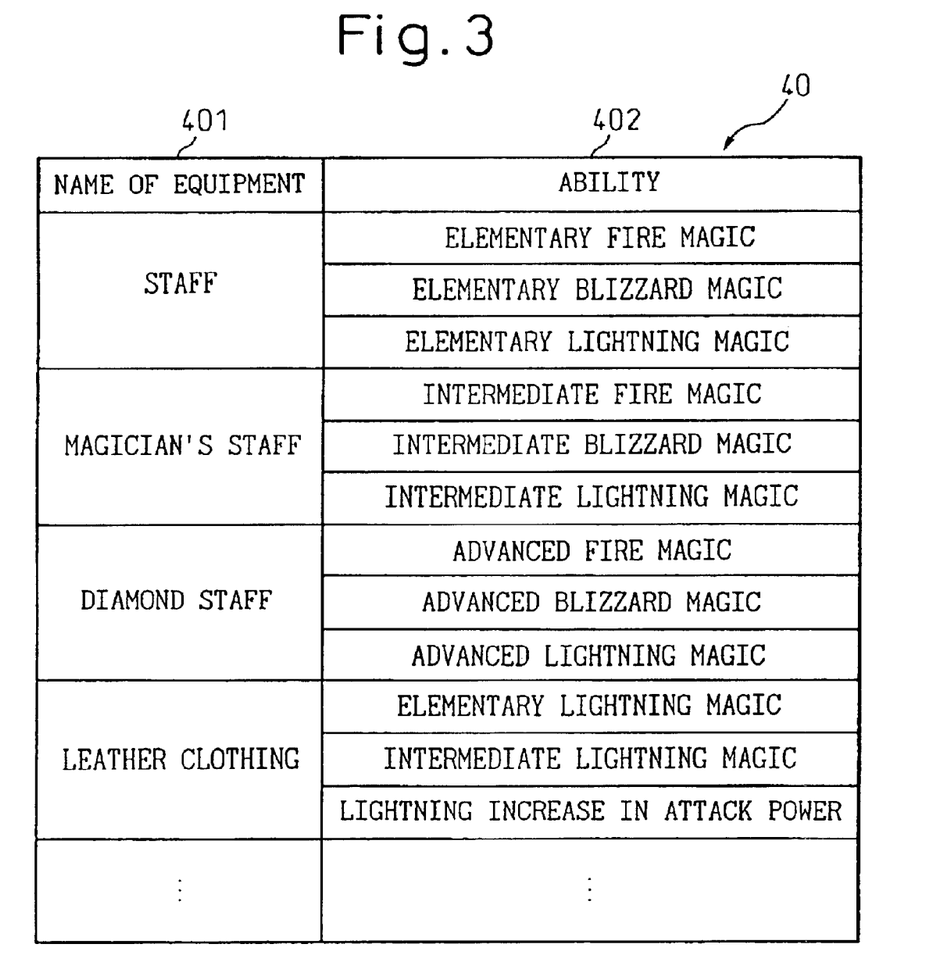
FIG. 3 is a view explaining an example of the data configuration of an equipment-ability relation table used in a game by a game control method according to an embodiment of the present invention.

First, the equipment-ability relation table 40 will be explained. FIG. 3 is a view of an example of the data configuration of the equipment-ability relation table 40. The equipment-ability relation table 40 defines the linkage of a special ability able to be used for each item of equipment (weapon, protective gear, accessory). The special abilities may include attack skills, magic, defensive skills, etc. As shown in FIG. 3, this is structured with a column 401 of the "NAME OF EQUIPMENT" and a column 402 of the "ABILITY" (special ability) linked with each item of equipment.

The equipment-ability relation table 40 in other words defines the special ability (attack skill, magic, defensive skill) able to be used when a character is provided with the equipment and updated in AP value for each item. The items of equipment (weapons, protective gear, and accessories) are unique to a game and, by way of non-limiting example, may be a "staff", "magician's staff", "diamond staff", "leather clothing", etc.

The special abilities (attack skills, magic, defensive skills) are also unique to a game and, by way of non-limiting example, may include an "elementary fire magic", "intermediate fire magic", "advanced fire magic", "elementary blizzard magic", "intermediate blizzard magic", "advanced blizzard magic", "elementary lightning magic", "intermediate lightning magic", "advanced lightning magic", etc.

An ability relating to magic is set with an attribute. For example, fire magic is the fire attribute, blizzard magic is the ice attribute, and lightning magic is the lightning attribute. Further, magic includes various levels, such as advanced magic, intermediate magic, and elementary magic. Among magic of the same attribute, elementary magic is the smallest in effect. Intermediate magic is larger in effect than elementary magic and smaller in effect than advanced magic. Advanced magic is largest in effect.

Note that these special abilities include ones having the effect of changing the ability values of a character such as an "increase in lightning attack power". For example, if the ability of an "increase in lightning attack power" can be used, when using lightning magic against an enemy character, the damage given to the enemy character is increased.

Here, the "fire magic" can be magic by which a character generates a fire ball to inflict damage on an enemy character by fire. "Blizzard magic" can be magic by which a character freezes the moisture in the atmosphere on the enemy character as ice crystals to inflict damage on the enemy character. Further, "lightning magic" can be magic by which a character causes a bolt of lightning to hit the head of the enemy character to inflict damage to the enemy character.

Note that magic includes defensive characteristics that can mitigate damage received by a player character due to an attack by an enemy character.

Zero to several special abilities defined by the equipment-ability relation table 40 and linked with each item of equipment may be set. In the example shown in FIG. 3, three special abilities are set for each item of equipment, such as the "elementary fire magic", "elementary blizzard magic", and "elementary lightning magic" for the "staff", although the number is not limited to three.

Figure 4:
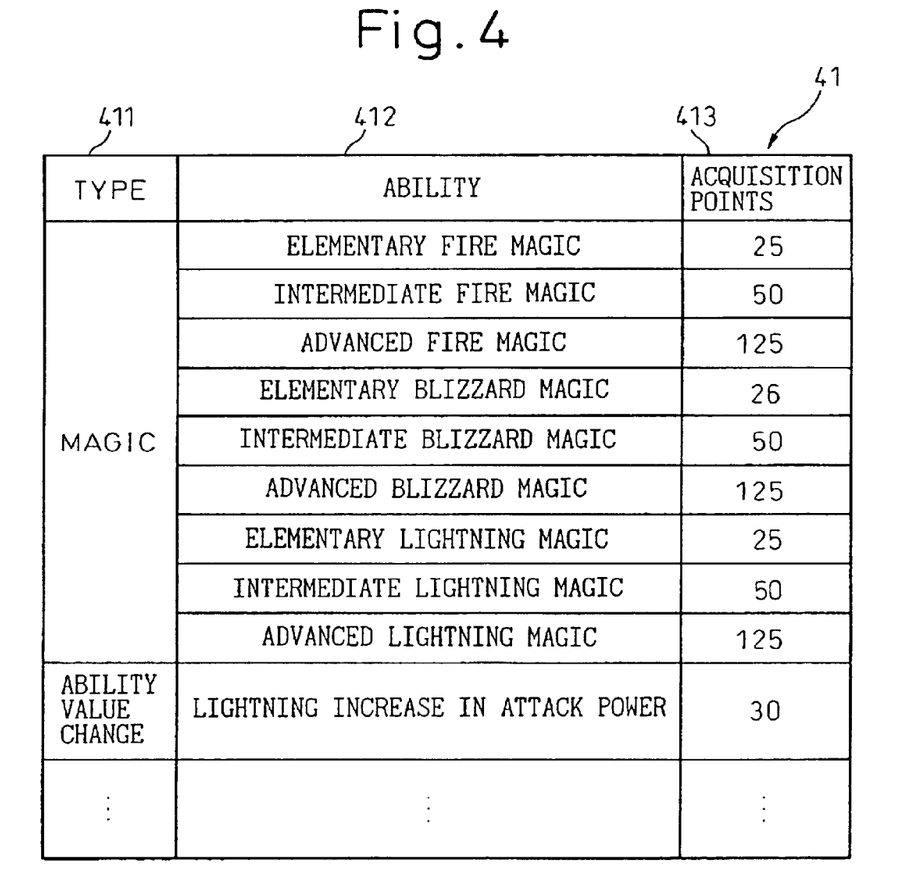
FIG. 4 is a view explaining an example of the data configuration of an ability-acquisition point relation table used in a game by a game control method according to an embodiment of the present invention.

Next, the ability-acquisition point relation table 41 stored in the ability relation data storage area 14C will be explained. FIG. 4 shows an example of the data configuration of the ability-acquisition point relation table 41. The ability-acquisition point relation table 41 defines an AP value, that is, acquisition points (complete AP value), for each special ability which may be used even without provision of the item of equipment.

As shown in FIG. 4, the ability-acquisition point relation table 41 is for example structured with a column 411 of the "TYPE OF SPECIAL ABILITY", a column 412 of the "NAME OF ABILITY (SPECIAL ABILITY)", and a column 413 setting the acquisition points for each special ability. The degree of difficulty of the special ability able to be used even without provision of an item of equipment (hereinafter referred to as an "acquired special ability") is determined by the acquisition points of the ability-acquisition point relation table 41.

In the present embodiment, the more advanced the special ability, in other words, the greater the effect of the special ability, the larger the value of the acquisition points set. For example, comparing magic of the fire attribute, the number of acquisition points for the "elementary fire magic" is "25"—the smallest value. The number of acquisition points for the "intermediate fire magic" is "50" or a value two times that of the "elementary fire magic". The number of acquisition points for the "advanced fire magic" is "125" or a value five times that of the "elementary fire magic" and 2.5 times that of the "intermediate fire magic".

Figure 5:
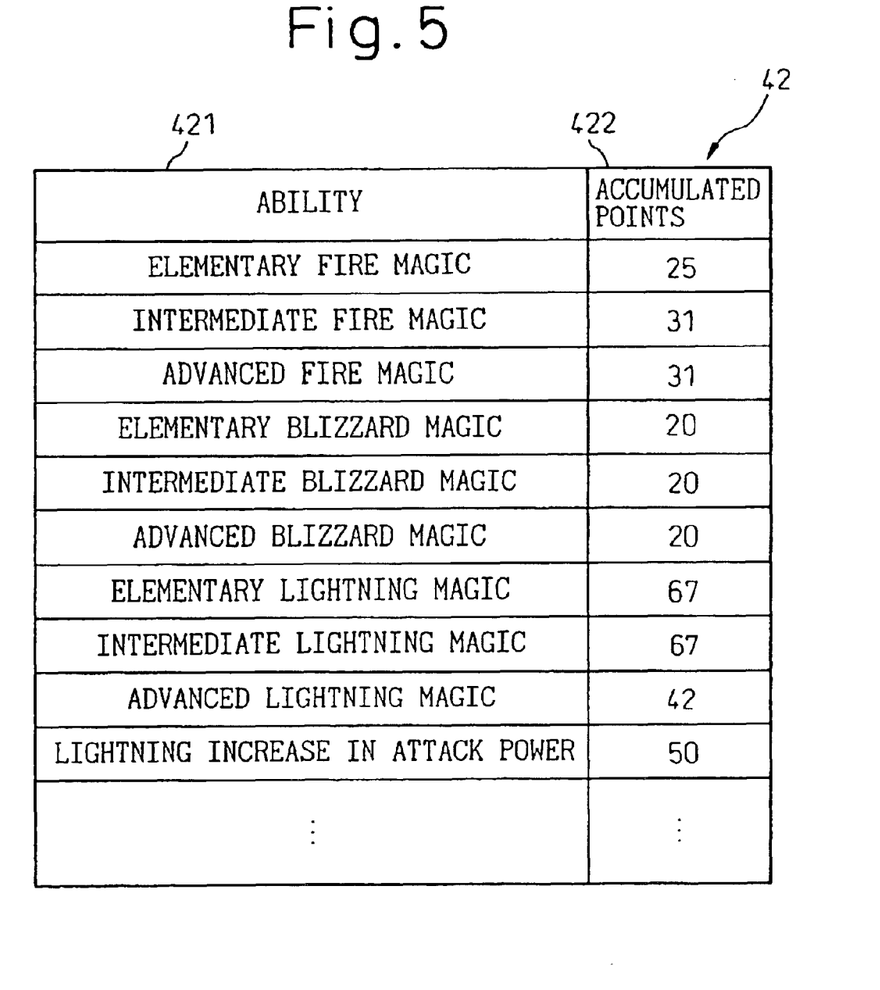
FIG. 5 is a view explaining an example of the data configuration of an ability-accumulated point relation table used in a game by a game control method according to an embodiment of the present invention.

Next, the ability-accumulated point management table 42 stored in the character ability data storage area 14D will be explained. FIG. 5 shows an example of the data configuration of the ability-accumulated point management table 42. The ability-accumulated point management table 42 is set for each character (at least the player character).

As shown in FIG. 5, the ability-accumulated point management table 42 for example is structured with a column 421 of the "NAME OF ABILITY (SPECIAL ABILITY)" and a column 422 of the accumulated points for each special ability (accumulated AP value). The ability-accumulated point management table 42 stores the accumulated points for acquisition of special abilities linked with the special abilities. For example, in the example of FIG. 5, the number of accumulated points for the "elementary fire magic" is "25". The number of accumulated points for the "intermediate fire magic" is "31". Further, the number of accumulated points for the "advanced fire magic" is "31".

The AP value of a special ability linked with an item of equipment which a player character is provided with among the special abilities is incremented and updated in accordance with the fight experience of the player character and enemy character. For example, the accumulated AP value is incremented and updated each time the player character wins. The accumulated AP value is a value in accordance with the level of mastery (degree of skill) of an item of equipment of the player character.

Note that the increase in the accumulated AP value may be set uniformly for each fight occurring in the process of progress of the game. Alternatively, it may be set to a value in accordance with the degree of difficulty of the victory in the fight or enemy character.

Figure 6:
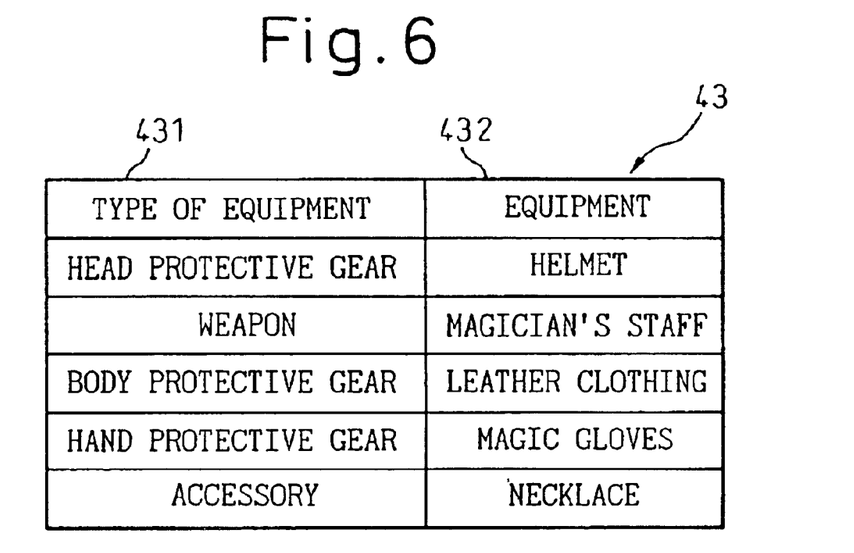
FIG. 6 is a view explaining an example of the data configuration of an equipment management table used in a game by a game control method according to an embodiment of the present invention.

Next, the equipment management table 43 will be explained. The equipment management table 43 is set for each character (at least the player character). FIG. 6 shows an example of the data configuration of the equipment management table 43. As shown in FIG. 6, the equipment management table 43 is structured with a column 431 of the "TYPE OF EQUIPMENT" and a column 432 of the "NAME OF EQUIPMENT". In the process of the progress of the game, the name of the equipment which the player character is provided with is written.

Note that in the present embodiment, there are limits on the number of items of equipment which a player character can simultaneously provide itself with. For example, it cannot provide itself with several of the same type of equipment. In the example shown in FIG. 6, there are five types of equipment, that is, head protective gear, weapons, body protective gear, hand protective gear, and accessories.

Figure 7:
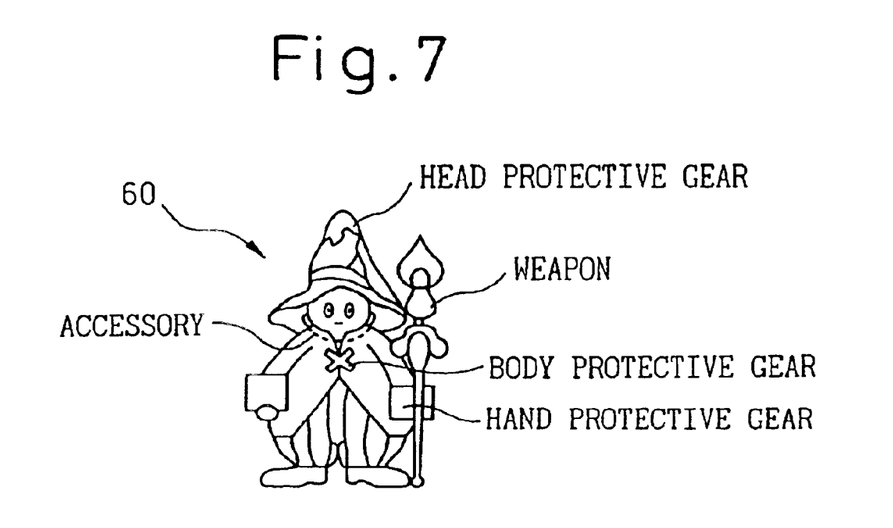
FIG. 7 is a view explaining an example of equipment of a character.

FIG. 7 shows an example of the equipment a character is provided with. As illustrated in FIG. 7, in the present embodiment, one character 60 can be provided with five items of equipment of different types. In the example of FIG. 7, head protective gear, weapons, body protective gear, hand protective gear, and accessories are provided. When items of equipment are taken on, the image of the character changes in accordance with the items of equipment. For example, when the character 60 is equipped with a helmet (head protective gear), an image of the character with the helmet is displayed.

Figure 8:
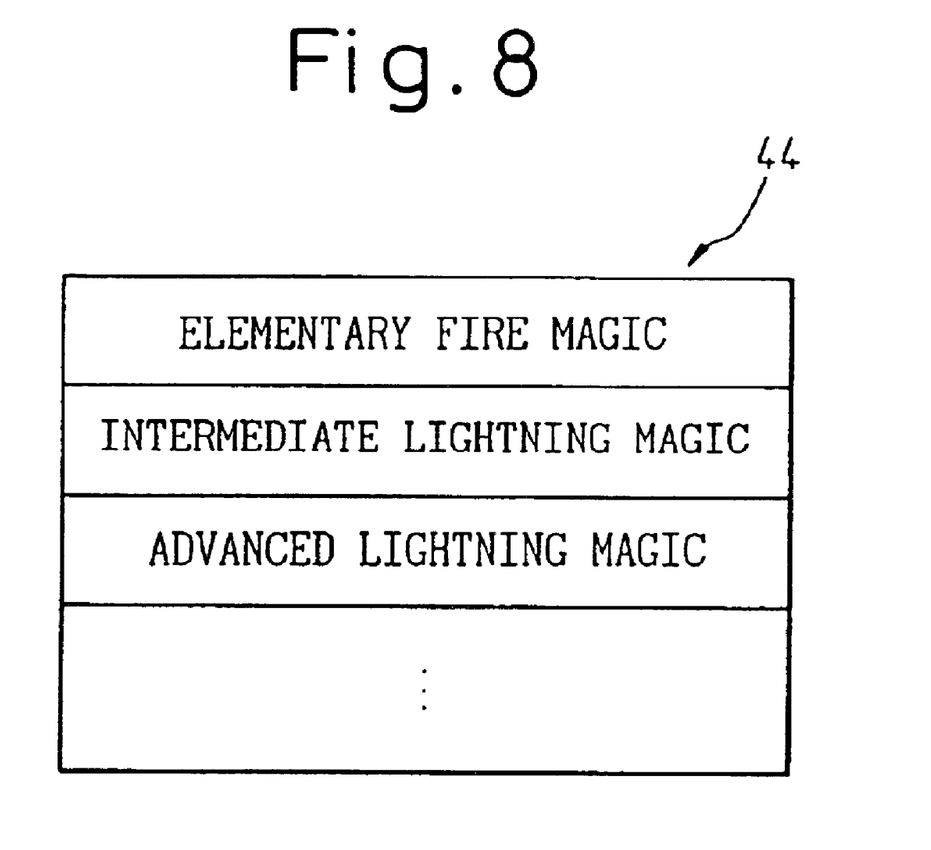
FIG. 8 is a view explaining an example of the data configuration of an acquired ability list used in a game by a game control method according to an embodiment of the present invention.

Next, the acquired ability list 44 will be explained. The acquired ability list 44 is also set for each character (at least the player character). FIG. 8 shows an example of the data configuration of an acquired ability list. As shown in FIG. 8, the acquired ability list 44 has written in it the special abilities acquired by the accumulated AP values rising over the acquisition points in the process of progress of the game. Note that there is no limit on the number of acquired special abilities. The number can be optionally set after the accumulated AP values pass the acquisition points. Note that no limit is placed on the number of acquired special abilities.

Next, a detailed explanation will be given of the operation of a video game system 10 according to the present embodiment.

The CPU 12 reads the program and data required for execution of the game through the CD-ROM drive 18 from a computer readable program product, that is, the CD-ROM 30, based on the operating system stored in the ROM 13 and transfers the same to the RAM 14 and hard disk drive 15.

The CPU 12 executes the program transferred to the RAM 14 so as to perform various types of processing for progress of the game explained below.

Note that some of the control operations performed by the video game system 10 include actual control performed by devices other than the CPU 12 together with the CPU 12. Here, for convenience in explanation, the control which has something to do with the CPU 12 is deemed direct control by the CPU 12 for simplification of the explanation.

Further, the program and data required for execution of the game are successively read from the CD-ROM 30 and transferred to the RAM 14 in accordance with the state of progress of processing along with commands from the CPU 12. In the following explanation, however, to facilitate the understanding of the present embodiment, a detailed explanation of the reading of data from the CD-ROM 30 and transfer of the data to the RAM 14 is omitted.

Figure 9:
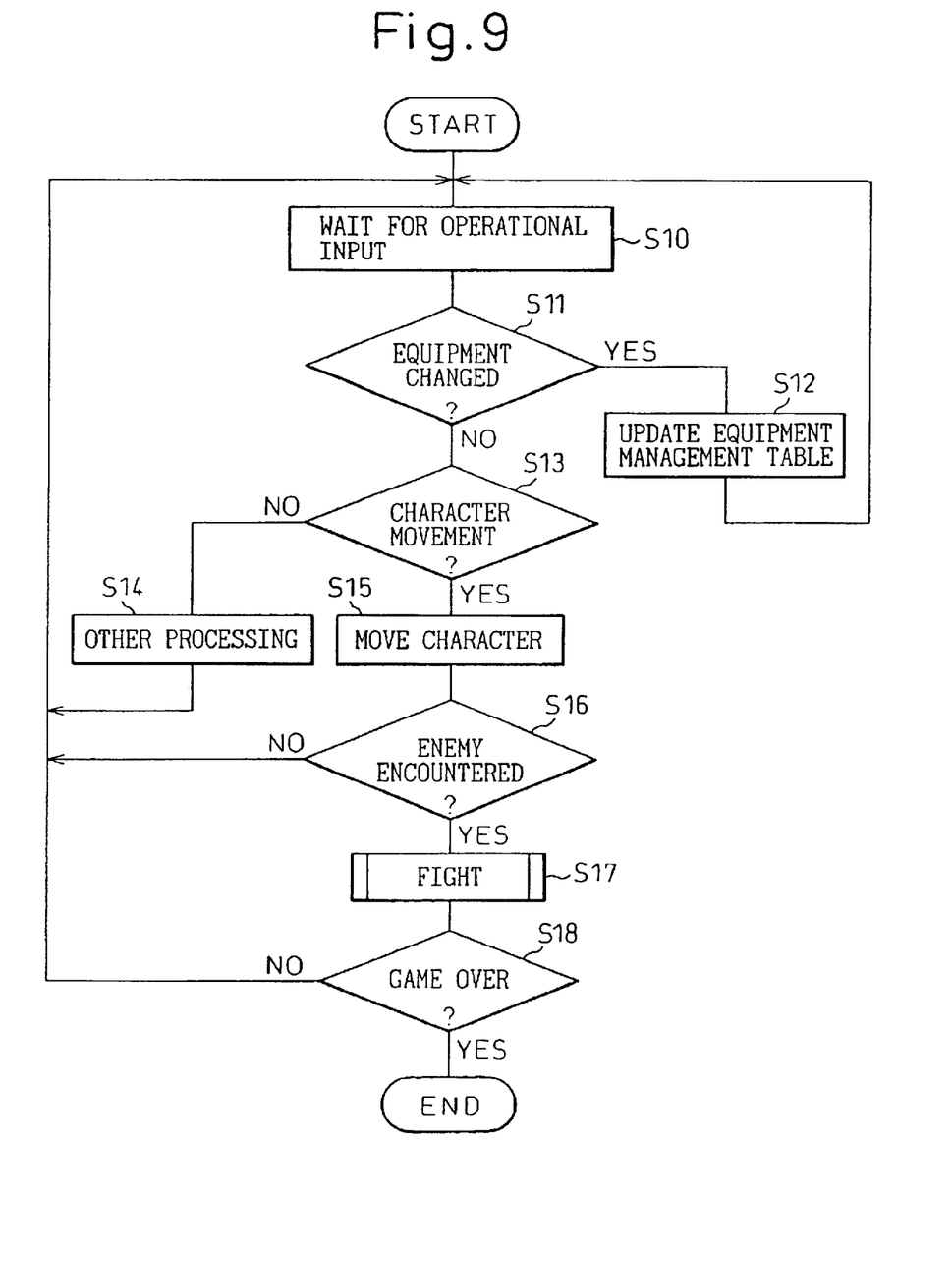
FIG. 9 is a general flowchart of the overall flow of a game by a game control method according to an embodiment of the present invention.

FIG. 9 shows the overall flow of a game according to the game control method according to the present embodiment.

First, the CPU 12 waits for an operational input from the keypad 50 (step S10). The operational input here includes changes in the equipment a player character is provided with etc.

When an operational input from the keypad 50 is received, the CPU 12 determines if the operational input relates to a change in the equipment (step S11). For example, when equipping of an item is instructed on the menu screen relating to a change of the item of equipment, the CPU 12 determines that there has been an operational input relating to a change of items of equipment.

When the operational input relates to a change in the items of equipment, the items of equipment of the player character are changed in accordance with that operational input. Due to the change of the items of equipment, the content of the equipment management table 43 shown in FIG. 6 is rewritten in accordance with the change of the items of equipment (step S12). For example, consider the case where there is an operational input for changing the weapon from a "magician's staff" to a "staff". In this case, the content of the "EQUIPMENT" column for the "WEAPON" row of the equipment management table 43 shown in FIG. 6 is changed from a "MAGICIAN'S STAFF" to "STAFF".

When the processing for updating the content of the equipment management table 43 is finished, the control returns to step S10.

If the operational input does not relate to a change of the item of equipment, the CPU 12 determines if the operational input relates to movement of the player character on the display screen (step S13).

When the operational input does not relate to movement of the player character on the display screen, other processing such as display of a menu on a screen or conversation with another character is performed (step S14). After the processing for the operational input is finished, control returns to step S10.

When the operational input does relate to movement of the player character on the display screen, processing for making the player character move in the game virtual space of the display screen in accordance with the operational input is performed (step S15).

When the processing for movement of the player character ends, the CPU 12 determines if the player character has encountered an enemy character due to that movement (step S16). "Encountering an enemy character" includes the player character approaching the position of an enemy character (movement to attackable area), appearance of an enemy character in the attackable area at the position of movement, etc.

When the player character encounters an enemy character, fight processing is performed (step S17). When the fight processing ends, the CPU 12 determines if the game has ended due to the elimination of the player character due to its defeat etc. (step S18). If the game should not end, control returns to step S18. Further, if the player character has not encountered an enemy character as a result of movement (NO determination at step S16), the CPU 12 waits for the next operational input (step S10).

Figure 10:
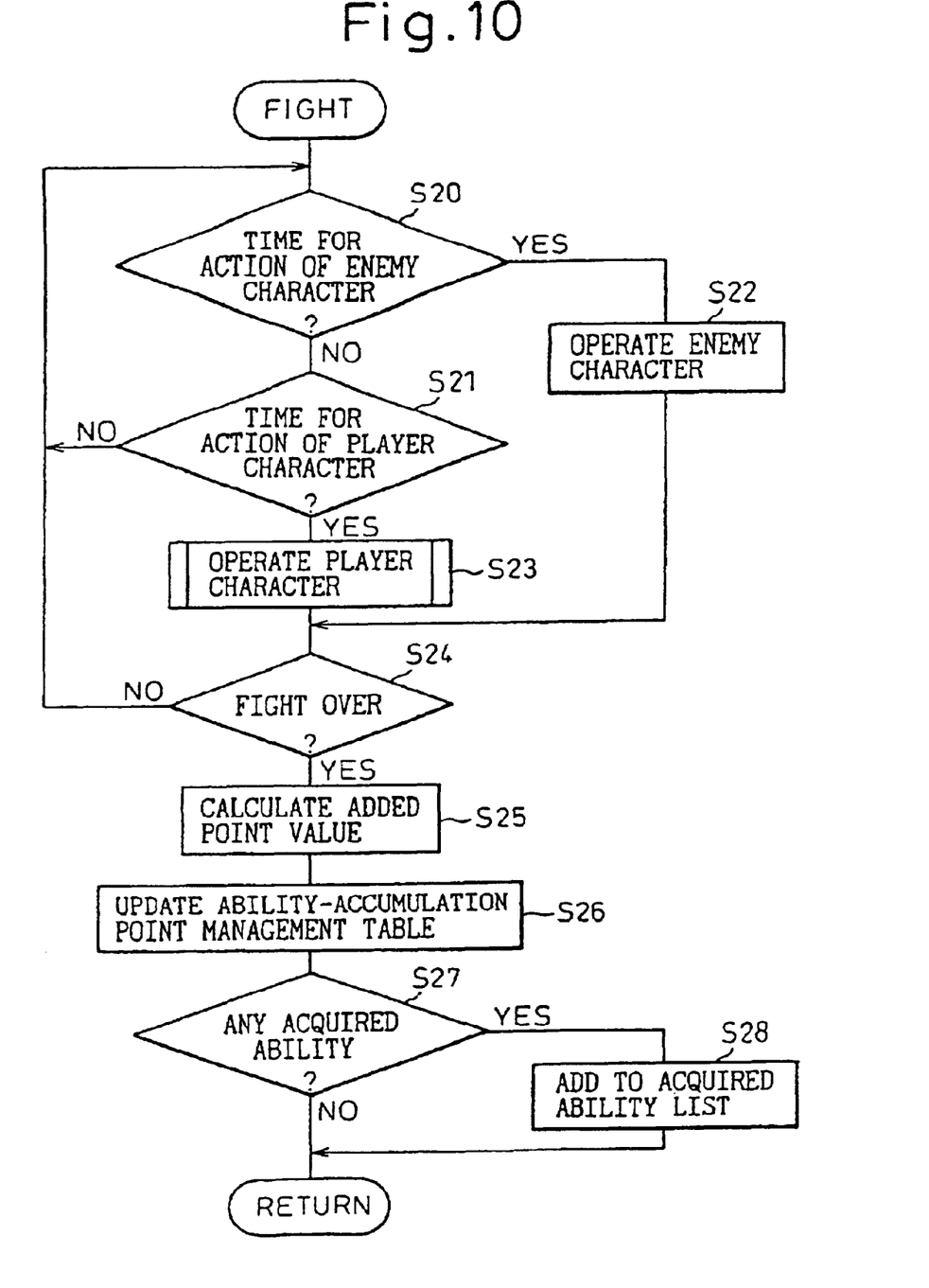
FIG. 10 is a flowchart of a fight processing routine in a game control method according to an embodiment of the present invention.

FIG. 10 shows the fight processing (step S17) routine.

In the fight processing routine, first the CPU 12 determines if the current point in the progress of the game is a time for action of the enemy character (step S20). If the result of the determination is NO, the CPU 12 determines if it is the time for action of the player character (step S21). The time for action of the enemy character and the time for action of the player character are determined in accordance with predetermined algorithms in accordance with the situation of the fight such as the elapse of a predetermined time from the previous action.

If the determination at step S20 is YES, processing for action of the enemy character is performed in accordance with an action control algorithm of the character included in the game program (step S22).

If the determination at step S20 is NO and the determination at step S21 is YES, processing is performed for action of the player character in accordance with the operational input by the player (step S23). The processing of action of the player character may include attack, magic, defense, etc. Further, if the determination at step S21 is NO, the CPU 12 determines if it is the timing for action of an enemy character (step S20).

When the processing of action of the enemy character or the processing of action of the player character ends, the CPU 12 determines if the fight has ended (step S24). The end of the fight is determined by whether the enemy character or player character is extinguished due to the fight. If the fight ends, the added points of the AP value are calculated in accordance with the results of the fight (step S25). The added points of the AP value are calculated for the character of the winning side. If the fight has not ended, the CPU 12 determines if the current point of time is the timing for action of the enemy character (step S20). The added points are preset in accordance with the various fight processings in a game. In this case, when a fight ends with a victory of the player character, the value preset for the fight processing may be made the added points.

When the player character has won, the CPU 12 confirms the equipment which the player character is provided with at the time of the fight from the equipment management table 43 shown in FIG. 6. Further, it finds the special ability linked with an item of equipment from the equipment-ability relation table 40 shown in FIG. 2. Further, it calculates the added points of the AP value of each special ability linked with the item of equipment provided.

For example, if the player character is equipped with a "staffs", the equipment-ability relation table 40 as shown in FIG. 3 is referred to and the special abilities linked with a "staff" are determined. In the example of FIG. 3, "elementary fire magic", "elementary blizzard magic", and "elementary lightning magic" are linked with a "staff". Therefore, the added points of the AP value are calculated for each of the "elementary fire magic", "elementary blizzard magic", and "elementary lightning magic". For example, the added points for each special ability are calculated as "+2".

When the added points finish being calculated, the added points, for example, "+2", are added to the current accumulated AP value of the corresponding special ability. The ability-accumulated point management table 42 shown in FIG. 5 is updated due to this (step S26).

For example, when the added points for each special ability linked with a "staff" are calculated to be "+2", in the ability-accumulated point management table 42 shown in FIG. 5, the accumulated points for the "elementary fire magic" are updated from "25" to "27". The accumulated points for the "elementary blizzard magic" are updated from "20" to "22". Further, the accumulated points for the "elementary lightning magic" are updated from "67" to "69".

Note that the accumulated AP values (accumulated point values) of the ability-accumulated point management table 42 are held without reset even if there is a change in the equipment or even if the equipment is not provided. Further, when a character reobtains equipment which it once divested itself with, the AP value is added to the previous accumulated AP value.

Next, the CPU 12 determines if the accumulated points of the updated ability-accumulated point management table 42 (accumulated AP value) has reached the acquisition points defined by the ability-acquisition point relation table 41 shown in FIG. 4 (step S27).

For example, when the accumulated points of the "elementary blizzard magic" are updated from "20" to "22", the acquisition points of the "elementary blizzard magic" in the ability-acquisition point relation table 41 are referred to. In the example shown in FIG. 4, the number of acquisition points of the "elementary blizzard magic" is "26". In this case, since the number of accumulated points "22" has not reached the acquisition points "26", it is determined that the "elementary blizzard magic" is not yet acquired. Further, when the number of accumulated points of the "elementary blizzard magic" is "26", since the number of accumulated points has reached the acquisition points "26", it is determined that the "elementary blizzard magic" has been acquired.

If the updated accumulated AP value reaches the acquisition points, the special ability corresponding to the accumulated AP value is rewritten in the acquired ability list 43 shown in FIG. 8 (step S28). For example, when it is determined that the "elementary blizzard magic" has been acquired, "elementary blizzard magic" is added and recorded in the ability acquisition list 43 shown in FIG. 8.

The ability added to the acquired ability list 42 is the ability determined to have been mastered in accordance with operation by the player. That is, having a player character fight equipped with an item increases the degree of skill of that item (level of mastery). Further, when the level of mastery of that item satisfies a predetermined condition, the ability linked with that item is added to the acquired ability list 43. The ability added to the acquired ability list 43 can be used in subsequent fights.

After the processing for updating the acquired ability list 43 is finished, processing is performed to determine if the game has ended as shown in FIG. 9 (step S18). Further, if the updated accumulated AP value has not reached the acquisition points (NO determination at step S27), processing is performed to determine if the game has ended as shown in FIG. 9 (step S18).

The special abilities written in the acquired ability list 43 shown in FIG. 8 can be used even if the player character is not provided with that equipment enabling use of those special abilities, even if the equipment is destroyed in the process of progress of the game, or even if the equipment is sold etc. and no longer held.

Figure 11:
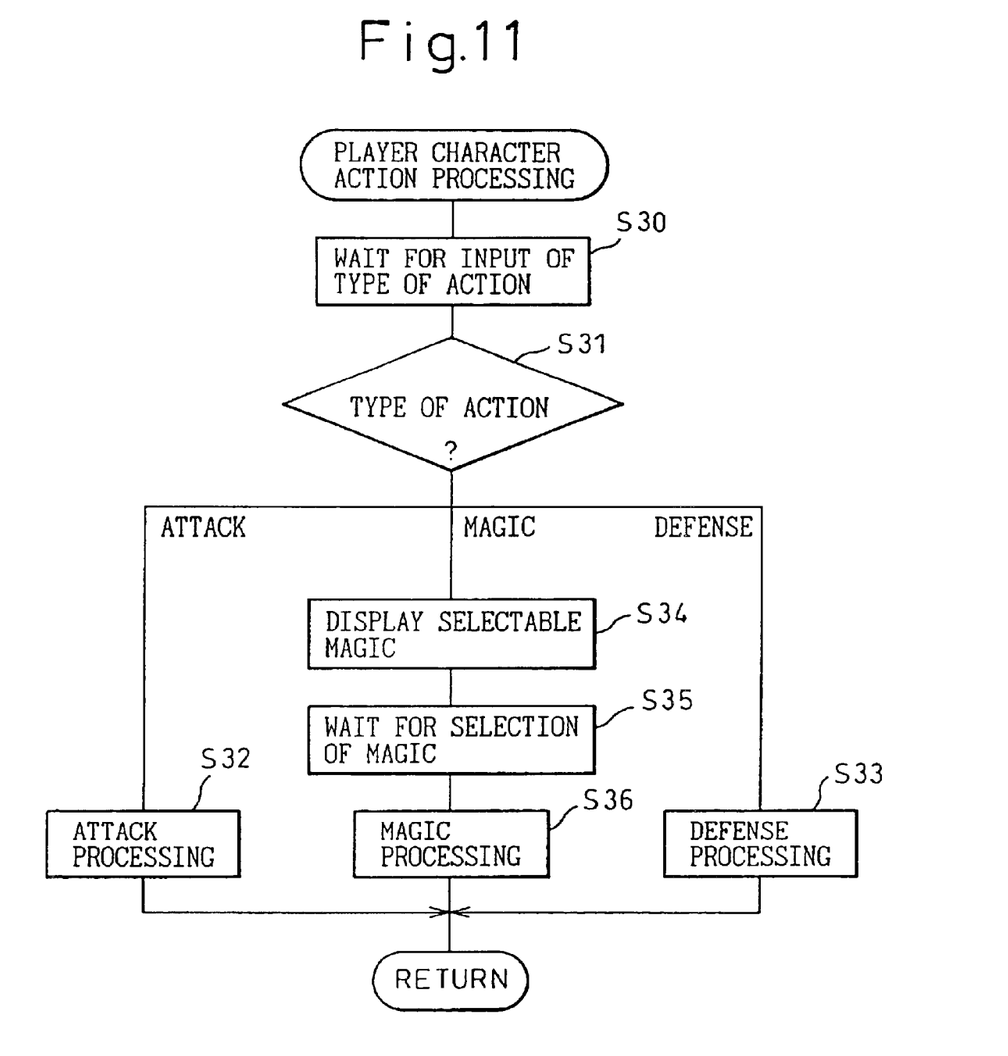
FIG. 11 is a flowchart of an action processing routine of a player character in a game by a game control method according to an embodiment of the present invention.

FIG. 11 shows an action processing (step S23) routine of a player character.

In the action processing routine of a player character, first the CPU 12 waits for input of the type of action by an operational input from the keypad 50 (step S30). In the present embodiment, as the types of action which can be input, "attack", "magic", and "defense" are provided. When waiting for input of the type of action, for example the list of the type of actions may be displayed on the screen. The type of action may be selected by operational input of a player by the keypad 50 from the displayed list.

Next the type of action designated by the operational input is determined (step S31). When the type of action designated is an "attack", the routine proceeds to step S32. When the type of action designated is a "defense", the routine proceeds to step S33. When the type of action designated is "magic", the routine proceeds to step S34.

When the type of action designated by the operational input is "attack", the attack processing is performed (step S32). In attack processing, a screen is displayed showing the player character attack an enemy character using a sword, another weapon, or bare handed. When the attack processing ends, the routine proceeds to step S24 of FIG. 10.

When the type of action designated by the operational input is "defense", the defense processing is performed (step S33). In defense processing, a screen is displayed showing the player character protecting itself from an enemy attack. When the defense processing ends, the routine proceeds to step S24 of FIG. 10.

When the type of action designated by the operational input is "magic", the items of equipment held are confirmed from the equipment management table 43. Further, the equipment-ability relation table 40 is referred to and the special abilities able to be used with the confirmed items of equipment are detected. In addition, the acquired ability list 43 is referred to in order to detect the acquired special abilities. The screen is displayed showing all special abilities of the magic type among the detected special abilities as selectable magic (step S34).

For example, when the player character is equipped with a "magician's staff" as the "weapon" as shown in the equipment management table 43 of FIG. 6, the name of equipment "magician's staff" in the equipment-ability management table 40 shown in FIG. 3 is referred to. Further, the fact that the special abilities linked with the "magician's staff" are "intermediate fire magic", "intermediate blizzard magic", and "intermediate lightning magic" is detected. These special abilities are all magic, so are selectable magic. Further, the acquired ability list 44 shown in FIG. 8 is set with "elementary fire magic", "intermediate lightning magic", and "advanced lightning magic". These special abilities are all magic, so are selectable magic.

Next, the CPU 12 waits for selection of magic used by operational input from the keypad 50 (step S35). When magic is selected by operational input, processing is performed for executing the selected magic (step S36). In the processing for execution of the magic, an image is displayed with the enemy character enveloped in, for example, fire. When the attack processing ends, the routine proceeds to step S24 of FIG. 10.

As explained above, by increasing the level of mastery of an item of equipment along with accumulation of fight experience of the player character along with progress in the game, it is made possible for the player character to be able to use the special ability linked with an item of equipment even without being provided with that item of equipment. Since there is no limit placed on the number of items of equipment, increasing the special abilities able to be used by a player character even without provision of the items of equipment enables the fight with an enemy character to proceed advantageously.

What kind of special abilities are set change depending on the items of equipment selected and set by the operator at the time of a fight. That is, if the items of equipment of a player character change in a fight scene, the special abilities acquired by the player character later change. Therefore, the player has to select items of equipment in accordance with the special abilities acquired by the player character. As a result, the player has to come up with a sophisticated strategy for selection of the items of equipment at the time of a fight and therefore gains increasingly enjoyment in devising the strategy for attack in the game.

For example, if a special ability appears in few effective scenes and need only be used temporarily, the player character need only be equipped with the item linked with that special ability in the scenes where that special ability can be effectively used. Further, if a special ability has a broad range of use and desirably should be used continuously, the player character is continuously equipped with the item linked with that special ability. Due to this, it is possible to have the player character acquire the special abilities for which continuous use is desirable. In this way, in a video game to which the present embodiment is applied, an accurate decision on the effectiveness of each special ability is sought from the player. Due to this, the means for increasing the abilities of the player character does not become monotonous.

Note that the video game system explained in the above embodiment was merely one example. The video game system for realization of the present invention is not limited to the video game system of the configuration shown in FIG. 1. For example, it may be provided with a digital versatile disk (DVD) drive instead of the CD-ROM drive 18.

Note that the game control method explained in the present embodiment may be realized by execution of a prepared program by a personal computer, video game system, etc. The game program according to this game control method is stored in a hard disk, floppy disk, CD-ROM, magneto-optic disk (MO), DVD, or other computer readable program product and executed by being read from the program product by a computer. Further, the program may be distributed through such a program product or through the Internet or other networks.

While the invention has been described by reference to specific embodiments chosen for purposes of illustration, it should be apparent that numerous modifications could be made thereto by those skilled in the art without departing from the basic concept and scope of the invention.

What is claimed is:

1. A computer program product embodied on a computer-readable medium storing a game program for making a character use an item during progress of a game, the game program, when executed, causing a computer to perform an action comprising:
   providing at least one item, each item being linked with at least one ability to be given to the character for mastery in accordance with operation of a player;
   making the character possess an item, the character being controlled in accordance with an operation of the player;
   judging whether a level of mastery for the possessed item satisfies a predetermined condition, the level of mastery being determined in accordance with the character's use of the item; and
   when the level of mastery for the possessed item satisfies the predetermined condition, giving the character a different ability, linked with the item, for use in the game in accordance with a subsequent operation of the player.

2. The program product as set forth in claim 1, wherein each of the at least one item comprises one of a protective gear and a weapon to be used for a fight, the level of mastery indicates a result of the fight while possessing the item, and the predetermined condition indicates a victory in the fight while possessing the item.

3. The program product as set forth in claim 2, wherein the program further manages the level of mastery by points, cumulatively adds points with each fight, has the predetermined condition indicate a threshold point, and gives the ability when the cumulatively added points exceed the threshold point.

4. The program product as set forth in claim 3, wherein the program cumulatively adds a victory point as the level of mastery for each of the at least one ability when the character wins a fight.

5. The program product as set forth in claim 1, wherein each the at least one ability comprises magic able to be used in a fight in the game.

6. The program product as set forth in claim 5, wherein the magic has an effect of inflicting damage on an enemy character in a fight or an effect of mitigating damage due to an attack by an enemy character in a fight.

7. A method of processing a game program making a character use an item in a progress of a game, the method comprising:
   providing at least one item, each item being linked with at least one ability to be given to a character for mastery in accordance with operation of a player;
   making a character possess an item, the character being controlled in accordance with operations of a player;
   judging a level of mastery for the possessed item, the level of mastery being determined in accordance with an activity of the character while possessing the item; and
   when the level of mastery for the possessed item satisfies a predetermined condition, giving the character a different ability, linked with the item, for use in the game in accordance with a subsequent operation of the player.

8. The method as set forth in claim 7, wherein each of the at least one item comprises one of a protective gear and a weapon to be used for a fight, the level of mastery indicates a result of the fight while possessing the item, and the predetermined condition indicates a victory in the fight while possessing the item.

9. The method as set forth in claim 8, further comprising managing the level of mastery by points;
   cumulatively adding points with each fight;
   having the predetermined condition indicate a threshold point; and
   giving the ability when the cumulatively added points exceed the threshold point.

10. The method as set forth in claim 9, further comprising cumulatively adding a victory point as the level of mastery when a character wins a fight.

11. The method as set forth in claim 7, wherein the ability comprises magic to be used in a fight in the game.

12. The method as set forth in claim 11, wherein the magic has an effect of inflicting damage on an enemy character in a fight or an effect of mitigating damage due to an attack by an enemy character in a fight.

13. A game system making a character use an item during progress of a game, the system comprising:
   a unit that performs the game in accordance with a program;
   a memory that stores at least a part of the program;
   a display screen that displays the game being performed by the unit; and
   the unit, in accordance with the program,
   providing at least one item, each item being linked with at least one ability to be given to a character for mastery in accordance with an operation of a player;
   making the character possess an item, the character being controlled in accordance with an operation of the player;
   judging a level of mastery for the possessed item, the level of mastery being determined in accordance with an activity of the character while possessing the item; and
   when the level of mastery for the possessed item satisfies a predetermined condition, giving the character a different ability, linked with the item, for use in the game in accordance with a subsequent operation of the player.

14. The game system as set forth in claim 13, wherein each of the at least one item comprises one of a protective gear and a weapon to be used for a fight, the level of mastery indicates a result of the fight while possessing the item, and the predetermined condition indicates a victory in the fight while possessing the item.

15. The game system as set forth in claim 14, wherein the unit further manages the level of mastery by points, cumulatively adds points with each fight, has the predetermined condition indicate a threshold point, and gives the ability when the cumulatively added points exceed the threshold point.

16. The game system as set forth in claim 15, wherein the unit cumulatively adds a victory point as the level of mastery when the character wins a fight.

17. The computer program product as set forth in claim 1, wherein the character can use the given ability without possessing the item.

18. The method as set forth in claim 7, wherein the character can use the given ability without possessing the item.

19. The game system as set forth in claim 13, wherein the character can use the given ability without possessing the item.

20. The program product as set forth in claim 3, wherein the points are cumulatively added to the level of mastery for each ability linked with the possessed item during the fight.

21. The method as set forth in claim 9, wherein the points are cumulatively added to the level of mastery for each ability linked with the possessed item during the fight.

22. The game system as set forth in claim 15, wherein the points are cumulatively added to the level of mastery for each ability linked with the possessed item during the fight.

23. The program product as set forth in claim 1, wherein the at least one item comprises a protective gear and the at least one ability linked with the protective gear comprises offensive abilities.

24. The method as set forth in claim 7, wherein the at least one item comprises a protective gear and the at least one ability linked with the protective gear comprises offensive abilities.

25. The game system as set forth in claim 15, wherein the at least one item comprises a protective gear and the at least one ability linked with the protective gear comprises offensive abilities.

* * * * *